US010282836B2

(12) United States Patent
Ravishankar et al.

(10) Patent No.: US 10,282,836 B2
(45) Date of Patent: May 7, 2019

(54) SYSTEM AND METHOD OF DATA ANALYSIS FOR DETECTING GROSS HEAD MOTION FROM PET IMAGES

(71) Applicant: GENERAL ELECTRIC COMPANY, Schenectady, NY (US)

(72) Inventors: Hariharan Ravishankar, Bangalore (IN); Ravindra Mohan Manjeshwar, Solon, OH (US); Floribertus PM Heukensfeldt Jansen, Ballston Lake, NY (US); Michel Souheil Tohme, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 15/235,523

(22) Filed: Aug. 12, 2016

(65) Prior Publication Data
US 2018/0047155 A1 Feb. 15, 2018

(51) Int. Cl.
*G06T 7/00* (2017.01)
*G06K 9/62* (2006.01)
(Continued)

(52) U.S. Cl.
CPC .......... *G06T 7/0012* (2013.01); *G06K 9/6214* (2013.01); *G06T 7/20* (2013.01);
(Continued)

(58) Field of Classification Search
CPC ....... G06T 7/0012; G06T 7/20; G06T 11/005; G06T 2207/30016; G06T 2207/10104;
(Continued)

(56) References Cited

U.S. PATENT DOCUMENTS 8,107,695 B2 1/2012 Wollenweber
10,064,591 B2 * 9/2018 Wang .................... G06T 11/005
(Continued)

OTHER PUBLICATIONS

Thielemans, K., et al., "Comparison of Different Methods for Data-driven Respiratory Gating of PET Data," IEEE Nuclear science symposium and medical imaging conference, pp. 1-4 (2013).
(Continued)

*Primary Examiner* — Yon J Couso
(74) *Attorney, Agent, or Firm* — Charlotte C. Wilson

(57) ABSTRACT

According to one embodiment, a method of image analysis is provided. The method includes binning image data into a plurality of sinogram frames, identifying a plurality of initial stationary frames by applying a first analysis technique on the plurality of binned sinogram frames, extracting a plurality of first statistical parameters applying a second analysis technique on the plurality of binned sinogram frames, combining the plurality of first statistical parameters with boundaries of plurality of initial stationary frames to generate a presentation of a joint analysis combining at least some of the plurality of the first statistical parameters and at least some of the plurality of the second statistical parameter, identifying a plurality of final stationary frames from the presentation of the joint analysis, independently reconstructing each of the plurality of final stationary frames, and registering each of the plurality of final stationary frames to a first state.

15 Claims, 9 Drawing Sheets

(51) Int. Cl.
*G06T 7/20* (2017.01)
*G06T 11/00* (2006.01)

(52) U.S. Cl.
CPC ...... *G06T 11/005* (2013.01); *G06K 2209/051* (2013.01); *G06T 2207/10104* (2013.01); *G06T 2207/20201* (2013.01); *G06T 2207/30016* (2013.01); *G06T 2207/30096* (2013.01); *G06T 2211/412* (2013.01)

(58) Field of Classification Search
CPC . G06T 2207/20201; G06T 2207/30096; G06T 2211/412; G06K 9/6214; G06K 2209/051
See application file for complete search history.

(56) References Cited

U.S. PATENT DOCUMENTS

| | | | | |
|---|---|---|---|---|
| 2003/0076988 | A1* | 4/2003 | Liang | G06T 5/10 382/131 |
| 2012/0281897 | A1* | 11/2012 | Razifar | A61B 6/032 382/131 |
| 2013/0028500 | A1* | 1/2013 | Takahashi | A61B 6/032 382/132 |
| 2015/0134261 | A1 | 5/2015 | O'Connor et al. | |
| 2016/0095565 | A1 | 4/2016 | Fenchel | |
| 2018/0247434 | A1* | 8/2018 | Qin | G06T 11/003 |

OTHER PUBLICATIONS

International Search Report and Written Opinion issued in connection with corresponding PCT Application No. PCT/US2017/045096 dated Oct. 25, 2017.
Bergstrom et al., "Head fixation device for reproducible position alignment in transmission CT and positron emission tomography." J Comput Assist Tomogr. ;vol. 5, pp. 136-141, 1981.
Daube et al., "Correction for motion distortion in PET by dynamic monitoring of patient position", J Nucl Med, vol. 31, 1990.
Pilipuf et al., "A noninvasive thermoplastic head immobilization system: technical note.", Journal of Neurosurgery, vol. 82, pp. 1082-1085, 1995.
Picard et al., "Motion correction of PET images using multiple acquisition frame", IEEE Trans Med Imaging, vol. 16, No. 2, pp. 137-144, 1997.
Fulton et al., "Correction for head movements in positron emission tomography using an optical motion-tracking system", IEEE Trans Nucl Sci, vol. 49, pp. 116-123, 2002.
Bloomfield et al., "The design and implementation of a motion correction scheme for neurological PET", Phys Med Biol., vol. 48, pp. 959-978, 2003.
Carson et al., "Design of a motion-compensation OSEM list-mode algorithm for resolution-recovery reconstruction for the HRRT", IEEE Nucl Sci Symp Conf Rec., vol. 5, pp. 3281-3285, 2003.
Buhler et al., "An accurate method for correction of head movement in PET", IEEE Trans Med Imaging, vol. 23, pp. 1176-1185, 2004.
Jin et al., "Accuracy of head motion compensation for the HRRT: Comparison of methods", Nuclear Science Symposium Conference Record (NSS/MIC), pp. 3199-3202, 2009.
Catana et al., "MRI-Assisted PET Motion Correction for Neurologic Studies in an Integrated MR-PET Scanner", J Nucl Med, Jan. 1, 2011, vol. 52, Issue 1, pp. 154-161, Jan. 1, 2011.
Olesen et al., "List-mode PET motion correction using markerless head tracking: proof-of-concept with scans of human subject" IEEE Trans Med Imaging, vol. 32, Issue 2, pp. 200-209, Feb. 2013.
Kris et al., "Using PCA to Detect Head Motion from PET List Mode Data", IEEE, 2013.
Huang et al., "Fast head motion detection using PET list-mode data", J Nucl Me, vol. 56, supplement 3 1827, May 1, 2015.
Schleyer et al., "Detecting and estimating head motion in brain PET acquisitions using raw time-of-flight PET data", Physics in Medicine and Biology, vol. 60, Issue 16, Aug. 6, 2015.

* cited by examiner

SYSTEM AND METHOD OF DATA ANALYSIS FOR DETECTING GROSS HEAD MOTION FROM PET IMAGES

BACKGROUND

The present invention generally relates to patient monitoring. More specifically, the technology disclosed herein relates to systems and methods for detecting gross head motion from Positron Emission Tomography (PET) images.

Head motion is difficult to avoid in long Positron Emission Tomography (PET) studies, degrading the image quality due to blurring and severe artifacts, thereby offsetting the benefit of using a high-resolution scanner. This may in turn lead to lower detectability of tumors, inaccurate SUV calculation, and incorrect lesion or planning volumes in radiation therapy. Secondly motion artifacts cause problems in attenuation correction of PET images.

There is scope of improvement in cost effectiveness, speed, ease of implementation and patient comfort.

BRIEF DESCRIPTION

In accordance with one aspect of the invention, a method of image analysis comprises binning image data into a number of sinogram frames, identifying a number of initial stationary frames by applying a first analysis technique on the number of binned sinogram frames, extracting a number of first statistical parameters applying a second analysis technique on the number of binned sinogram frames, combining the number of first statistical parameters with boundaries of number of initial stationary frames to generate a presentation of a joint analysis combining at least some of the plurality of the first statistical parameters and at least some of the plurality of the second statistical parameter, identifying a number of final stationary frames from the presentation of the joint analysis, independently reconstructing each of the number of final stationary frames and registering each of the number of final stationary frames to a first state.

In accordance with another aspect of the invention, a system for image analysis comprises a correlation analysis module configured to receive a stream of PET list mode data binned into a number of sinogram frames, and identify a number of initial stationary frames by applying a correlation analysis technique on the number of binned sinogram frames. The image analysis module also comprises a principal analysis module independently coupled to the correlation analysis module and configured to receive the stream of PET list mode data binned into the number of sinogram frames, and extract a number of weight factors applying a principal component analysis technique on the number of binned sinogram frames. The image analysis module also comprises an image reconstruction module independently coupled to the correlation analysis module and the principal analysis module and configured to combine the number of weight factors with boundaries of the number of initial stationary frames to generate a presentation of a joint analysis combining results from the correlation analysis and the principal component analysis, identify a number of final stationary frames from the presentation of the joint analysis, independently reconstruct each of the number of final stationary frames, and register each of the number of final stationary frames to a first state.

In accordance with yet another aspect of the invention, a non-transitory, computer-readable medium storing instructions that, when executed by a computer processor, cause the computer processor to perform a method of image analysis comprises binning image data into a number of sinogram frames, identifying a number of initial stationary frames by applying a first analysis technique on the number of binned sinogram frames, extracting a number of first statistical parameters applying a second analysis technique on the number of binned sinogram frames, combining the number of first statistical parameters with boundaries of number of initial stationary frames to generate a presentation of a joint analysis combining at least some of the plurality of the first statistical parameters and at least some of the plurality of the second statistical parameter, identifying a number of final stationary frames from the presentation of the joint analysis, independently reconstructing each of the number of final stationary frames and registering each of the number of final stationary frames to a first state.

DRAWINGS

Embodiments described herein will become better understood when the following detailed description is read with reference to the accompanying drawings in which like characters represent like parts throughout the drawings, wherein.

DETAILED DESCRIPTION

Figure 1:
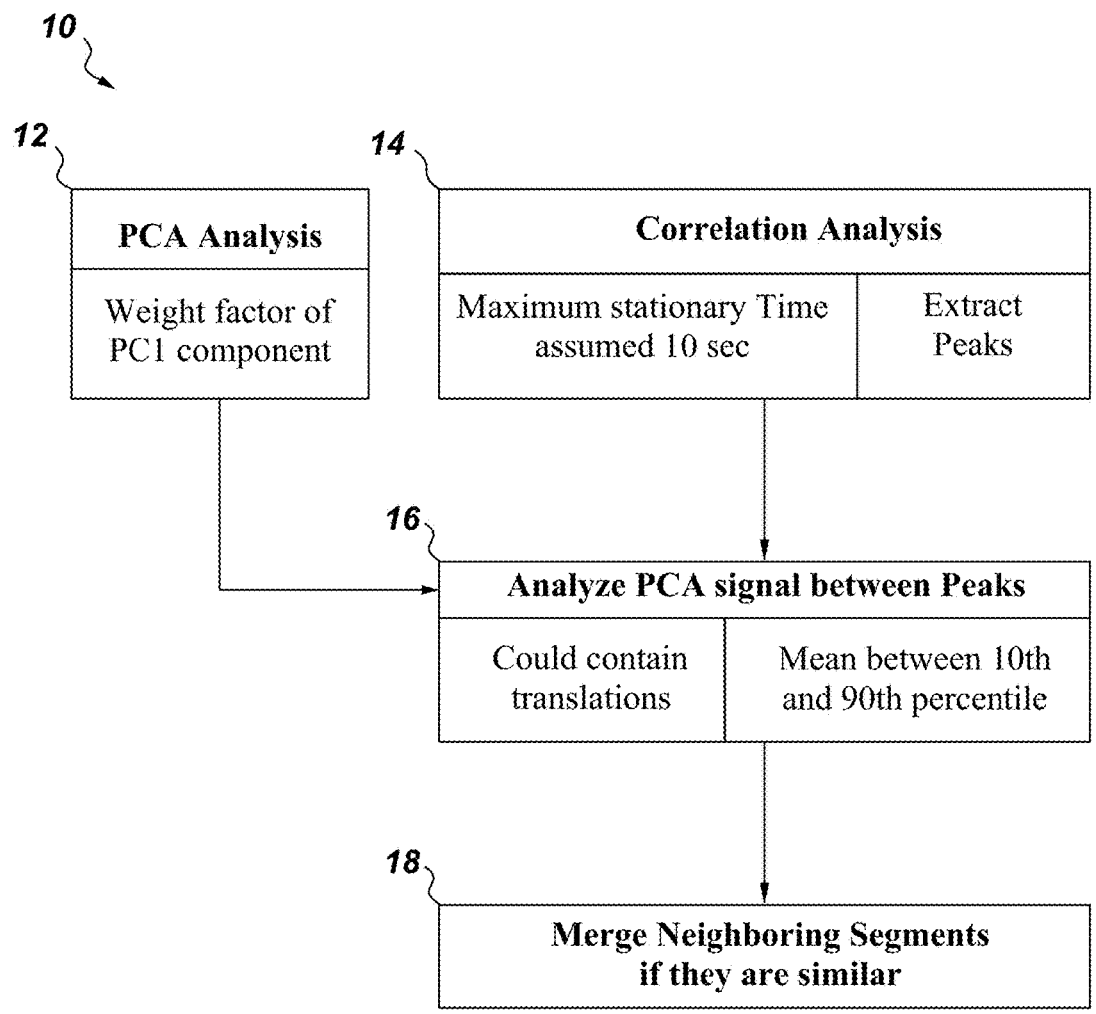
FIG. 1 illustrates a workflow for automated head motion detection in accordance with one embodiment of this invention.

Example embodiments are described below in detail with reference to the accompanying drawings, where the same reference numerals denote the same parts throughout the drawings. Some of these embodiments may address the above and other needs. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Head motion is difficult to avoid in long PET studies, degrading the image quality due to blurring and severe artifacts, thereby offsetting the benefit of using a high-resolution scanner. This may in turn lead to lower detectability of tumors, inaccurate SUV calculation, and incorrect lesion or planning volumes in radiation therapy. Secondly motion artifacts cause problems in attenuation correction of PET images. In this disclosure, the patient head motion information is inferred from the acquired PET data. A fully automated and data-driven motion estimation approach proposed that eliminates the need for an external tracking systems such as systems that typically uses several variations of cameras and markers. The advantages are cost effectiveness, speed, ease of implementation and patient comfort.

Majority of existing solutions depend upon external tracking systems to monitor patient head motion. The key component of any head motion detection algorithm is to decipher the time boundaries between stationary head positions and compensate for the motion between these stationary positions. The generic approach is to bin the acquired PET data into multiple frames such that these bins should have less intra-frame motion.

There are two major classes of approaches reported in literature. In the first set of methods, an external monitor continuously tracks the head of the subject during PET acquisition and bins them into new frames whenever there is detectable head motion. Such methods fall under multiple acquisition frames method (MAF), where the data is prospectively binned into frames based on the external tracker signal. In the second set of methods, the stationary head position durations are inferred from the data retrospectively. There have been methods that use PET data or simultaneously acquired MR data to bin the PET acquisition frames minimizing the intra-frame motion.

As one non-limiting instance of the second set of methods, data dimensionality techniques including PCA have proved extremely successful in respiratory motion detection. Principal component analysis (PCA) is a statistical procedure that uses an orthogonal transformation to convert a set of observations of possibly correlated variables into a set of values of linearly uncorrelated variables called principal components. The number of principal components is typically less than or equal to the number of original variables. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. The principal components are orthogonal because they are the eigenvectors of the covariance matrix, which is symmetric. PCA is essentially sensitive to the relative scaling of the original variables.

PCA is an analogue of the principal axis theorem in mechanics and is mostly used as a tool in exploratory data analysis and for making predictive models. PCA can be done by eigenvalue decomposition of a data covariance (or correlation) matrix or singular value decomposition of a data matrix, usually after mean centering (and normalizing or using Z-scores) the data matrix for each attribute. The results of a PCA are usually discussed in terms of component scores, sometimes called factor scores (the transformed variable values corresponding to a particular data point), and loadings (the weight by which each standardized original variable should be multiplied to get the component score).

In some diagnostic situations for head motion detection, procedures similar to respiratory motion detection is followed, but there are two major challenges in relation to use of data dimensionality techniques: 1) Head motion is non-periodic and irregular. Unlike respiratory or cardiac motion problems, there is no mechanism to select the component of interest. 2) For Automated detection of stationary states, in typical other studies involving PCA for head motion with manual demarcation of steps has been proposed. The authors, in such situations, manually select the stationary states from the PCA signal.

FIG. 1 illustrates a workflow for automated head motion detection in accordance with one embodiment of this invention. The proposed approach falls under the data-driven category. A combination of Principal component analysis and correlation analysis is used on dynamic sinogram data to detect sudden head motion. The workflow begins by binning the acquired PET list mode data into sinograms of smaller frames and then correlation between successive frames and perform an extrema analysis is computed. The time locations of the minima provide us initial candidates of points where the subject could have moved the head.

Referring to FIG. 1, in one embodiment of the current invention, low spatial resolution dynamic sinograms are created from PET list mode data. These sinograms are concatenated across time and serve as the input matrix to source to head motion component detection algorithm—PCA, as in workflow step 12. The weight factors corresponding to the significant Principal components of interest have been investigated in prior art for presence of the physiological signal of interest, such as respiratory or cardiac signals. In the current situation, similar procedure is followed for head motion detection after overcoming the challenges mentioned above. PCA on the dynamic sinogram data is performed and principal components corresponding to the highest Eigen value are retained signifying strongest components of change. In one embodiment of the invention, the gross head motion is assumed to be the strongest component of change in the sinogram data. Hence the principal component is analyzed corresponding to the largest Eigen value. In other embodiments of the invention, Independent Component Analysis, Non-negative matrix factorization or Projection Pursuits can be used to extract the strongest component of change. Independent Component Analysis relates to attempts to decompose a multivariate signal into independent non-Gaussian signals. Deep neural networks can also be deployed for separating the source signal corresponding to gross head motion from dynamic sinograms. Unsupervised learning neural network architectures including restricted Boltzmann machine, deep belief networks, stacked auto-encoders and also supervised learning architectures like convolutional networks can be used for obtaining gross head motion component.

In the context of linear algebra, a scalar $\lambda$ is called an eigenvalue of the n×n (square) matrix A if there is a nontrivial solution x of $Ax=\lambda x$. Such an x is called an eigenvector corresponding to the eigenvalue $\lambda$. An eigenvector or characteristic vector of a linear transformation T from a vector space X over a field F into itself is a non-zero vector that does not change its direction when that linear transformation is applied to it. In other words, if x is a vector that is not the zero vector, then it is an eigenvector of a linear transformation T if T(x) is a scalar multiple of x. If the vector space X is finite-dimensional, then the linear transformation T can be represented as a square matrix A, and the vector x by a column vector, rendering the above mapping as a matrix multiplication on the left hand side and a scaling of the column vector on the right hand side in the equation Ax=λx. There is a correspondence between n by n square matrices and linear transformations from an n-dimensional vector space to itself. For this reason, it is equivalent to define eigenvalues and eigenvectors using either the language of matrices or the language of linear transformations. Geometrically, an eigenvector corresponding to a real, nonzero eigenvalue points in a direction that is stretched by the transformation and the eigenvalue is the factor by which it is stretched. If the eigenvalue is negative, the direction is reversed.

As has been mentioned above, it is hypothesized that the components corresponding to largest Eigenvalue captures the gross head motion. The PCA signal level is analyzed next, between peaks provided by the correlation analysis, as in workflow step 14 and evaluated if the segments should be merged together. Referring to FIG. 1, Correlation analysis and PCA analysis are combined, as in workflow step 16, to automatically detect head motion as explained below. In one embodiment of the invention, instead of Correlation analysis, other methods such as mutual information, etc. can be used with suitable accommodation and adjustments made for the advantages and disadvantages.

Correlation analysis typically involves identifying the relationship between a dependent variable and one or more independent variables. The correlation coefficient is a measure of linear association between two variables. Values of the correlation coefficient are always between −1 and +1. A correlation coefficient of +1 indicates that two variables are perfectly related in a positive linear sense, a correlation coefficient of −1 indicates that two variables are perfectly related in a negative linear sense, and a correlation coefficient of 0 indicates that there is no linear relationship between the two variables. For simple linear regression, the sample correlation coefficient is the square root of the coefficient of determination, with the sign of the correlation coefficient being the same as the sign of b1, the coefficient of x1 in the estimated regression equation. Correlation analyses cannot be interpreted as establishing cause-and-effect relationships. They can indicate only how or to what extent variables are associated with each other. The correlation coefficient measures only the degree of linear association between two variables. Any conclusions about a cause-and-effect relationship must be based on the judgment of the analyst.

Referring back to FIG. 1, a running correlation metric is used between successive pairs of sinogram frames to help automatic detection of head states. The hypothesis is that whenever there is head movement, the correlation between corresponding sinogram frames is likely to be low. The correlation analysis is used primarily as an aid in automated state detection from the more stable PCA signal.

Let C(t) be the correlation between two sinograms (S) separated by time ∂t:

$$C(t) = \text{corr}(S_t, S_{t+dt})$$

$$M(t) = 1 - C(t)$$

Thus, the PET list mode data are initially binned into sinogram frames of smaller durations. Extrema analysis on the M-metric mentioned above is computed on the sinogram data providing a set of initial candidates for stationary states. By analyzing the PCA signal levels between these maxima points, a decision is made to merge these segments giving a final set of stationary head motion states. Finally, the neighboring segments are merged if the PCA signal levels are similar, thereby inferring the stationary head states, as shown in step 18.

Figure 2:
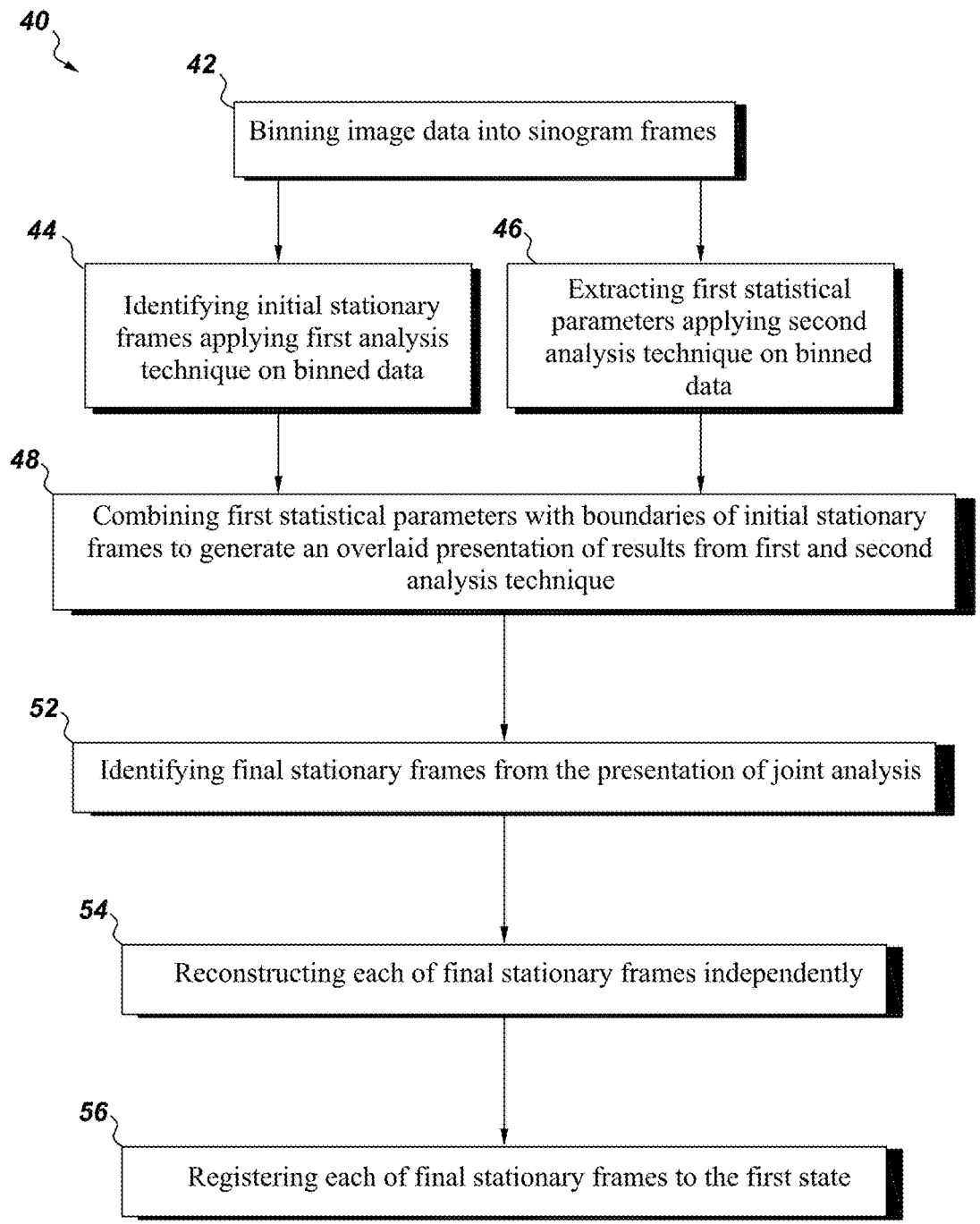
FIG. 2 illustrates a method of image analysis in accordance with one embodiment of this invention.

The detailed steps of the work flow captured in FIG. 1 are further formulated as an algorithm in FIG. 2. FIG. 2 illustrates a method of image analysis 40 in accordance with one embodiment of the present invention. Method of image analysis 40 includes binning image data into a number of sinogram frames, as in step 42. The method 40 also includes identifying a number of initial stationary frames by applying a first analysis technique on the number of binned sinogram frames, as in step 44 and extracting a number of first statistical parameters applying a second analysis technique on the number of binned sinogram frames, as in step 46. Method 40 further includes combining the number of first statistical parameters with boundaries of number of initial stationary frames to generate a presentation of a joint analysis combining at least some of the plurality of the first statistical parameters and at least some of the plurality of the second statistical parameter, as in step 48. Method 40 also includes identifying a number of final stationary frames from the presentation of the joint analysis, as in step 52 and independently reconstructing each of the number of final stationary frames as in step 54. The method 40 also includes registering each of the number of final stationary frames to a first state, as in step 56.

Figure 3:
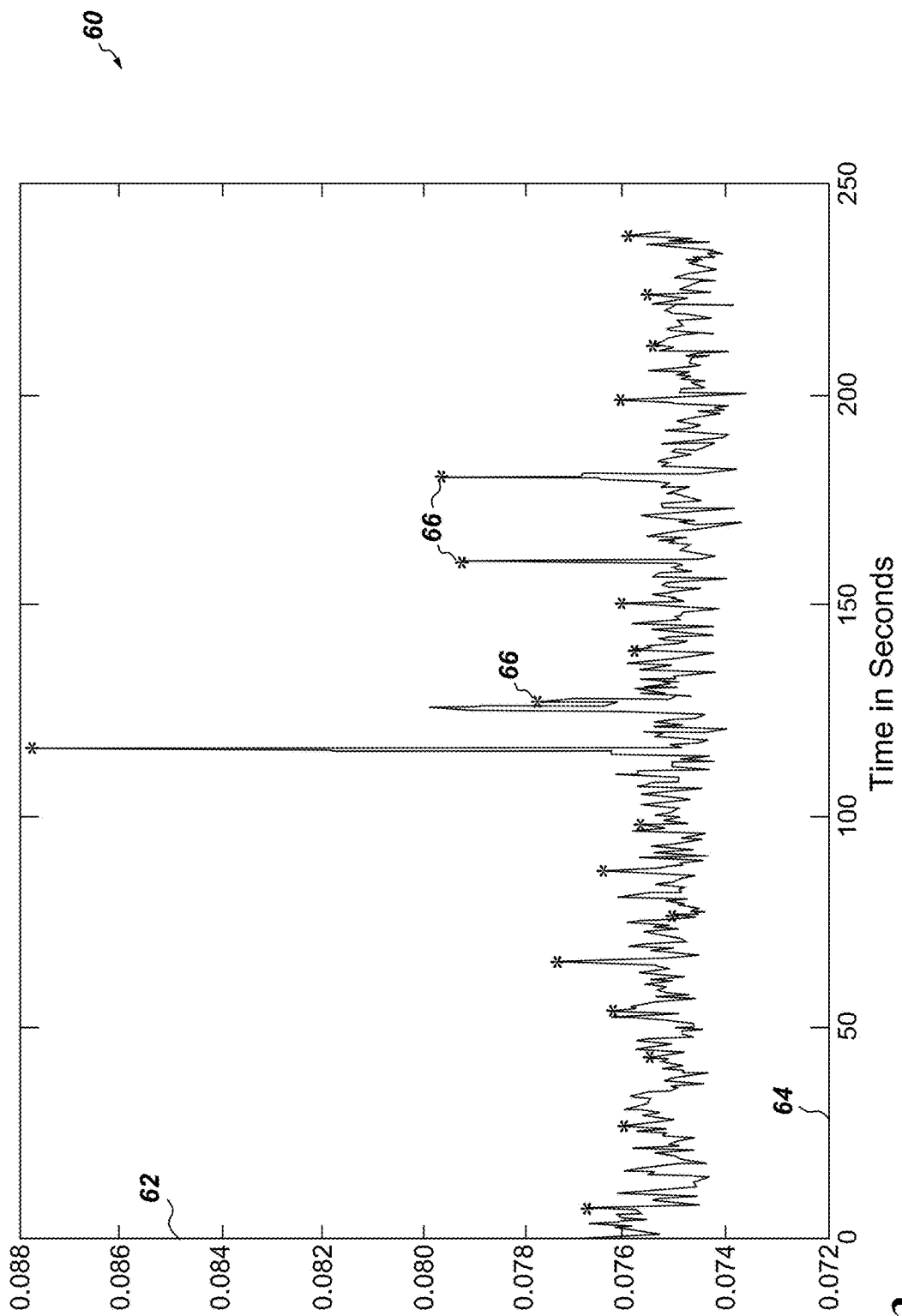
FIG. 3 illustrates M-metric on the y-axis Vs time in seconds in accordance with one embodiment of this invention.

Identifying a number of initial stationary frames, as in step 44 (FIG. 2), includes relating each of the number of initial stationary frames to two successive ones of a number of relevant maxima points of an M-metric computed by applying the first analysis technique, as in FIG. 3. FIG. 3 illustrates a plot of M-metric (60) on the y-axis (62) Vs time in seconds (64) in accordance with one embodiment of this invention. Since PET data can be noisy, there could be multiple irrelevant peaks. In other words, the time-distance between two successive peaks should be greater than a predetermined threshold values such as 10 sec. The detected peaks 66 are shown in the FIG. 3. The portions between these peaks give us the potential stationary segments. Relating each of the number of initial stationary frames to two successive ones of a number of relevant maxima points of the M-metric includes eliminating a number of non-relevant maxima points from a number of initial maxima points of the M-metric based on a threshold minimum time distance between two successive ones of the number of initial maxima points to generate the number of relevant maxima points, as in FIG. 3.

Figure 4:
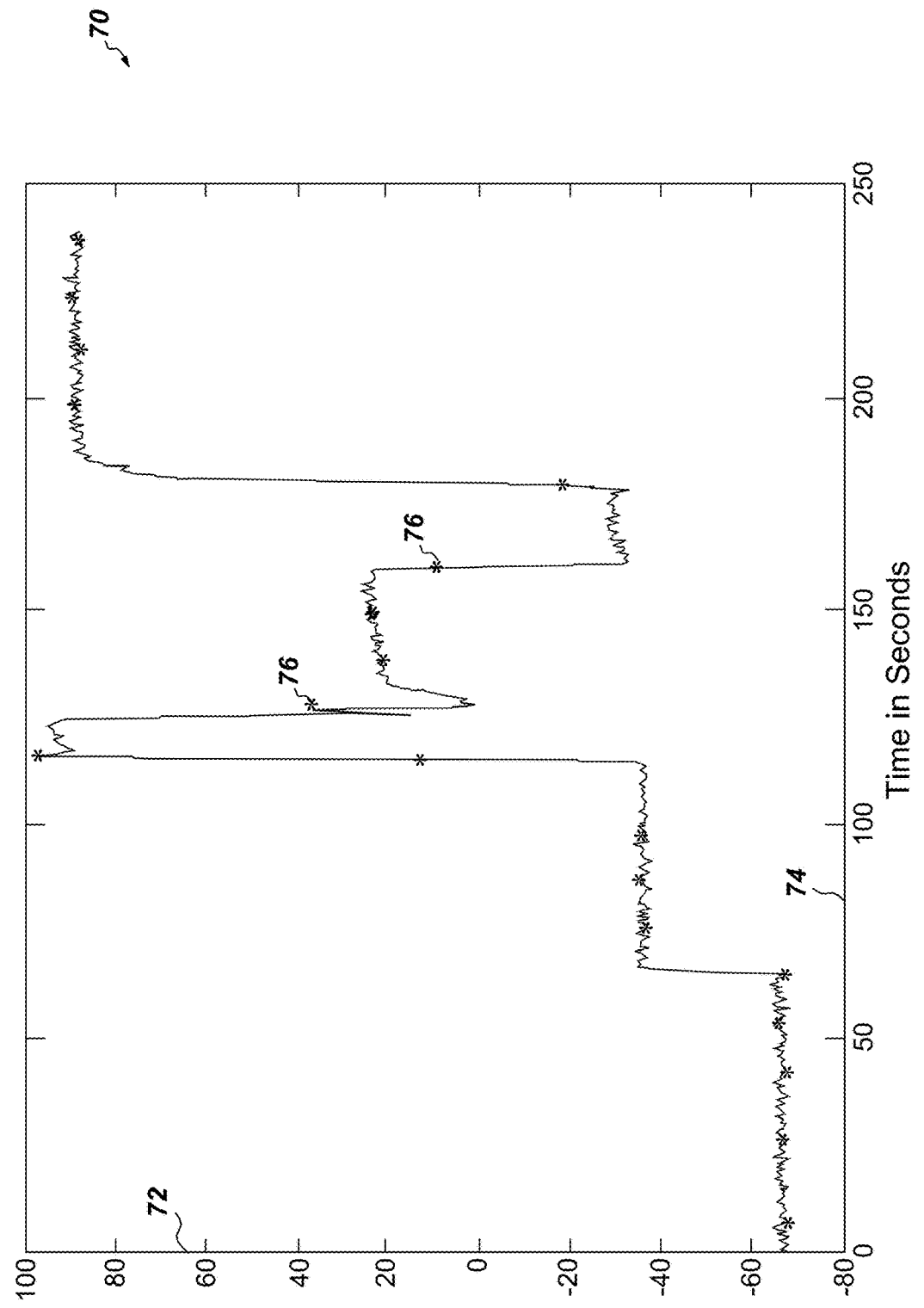
FIG. 4 illustrates a number of weight factors of principal components jointly analyzed with segment boundaries from correlation analysis, in accordance with one embodiment of this invention.
Figure 5:
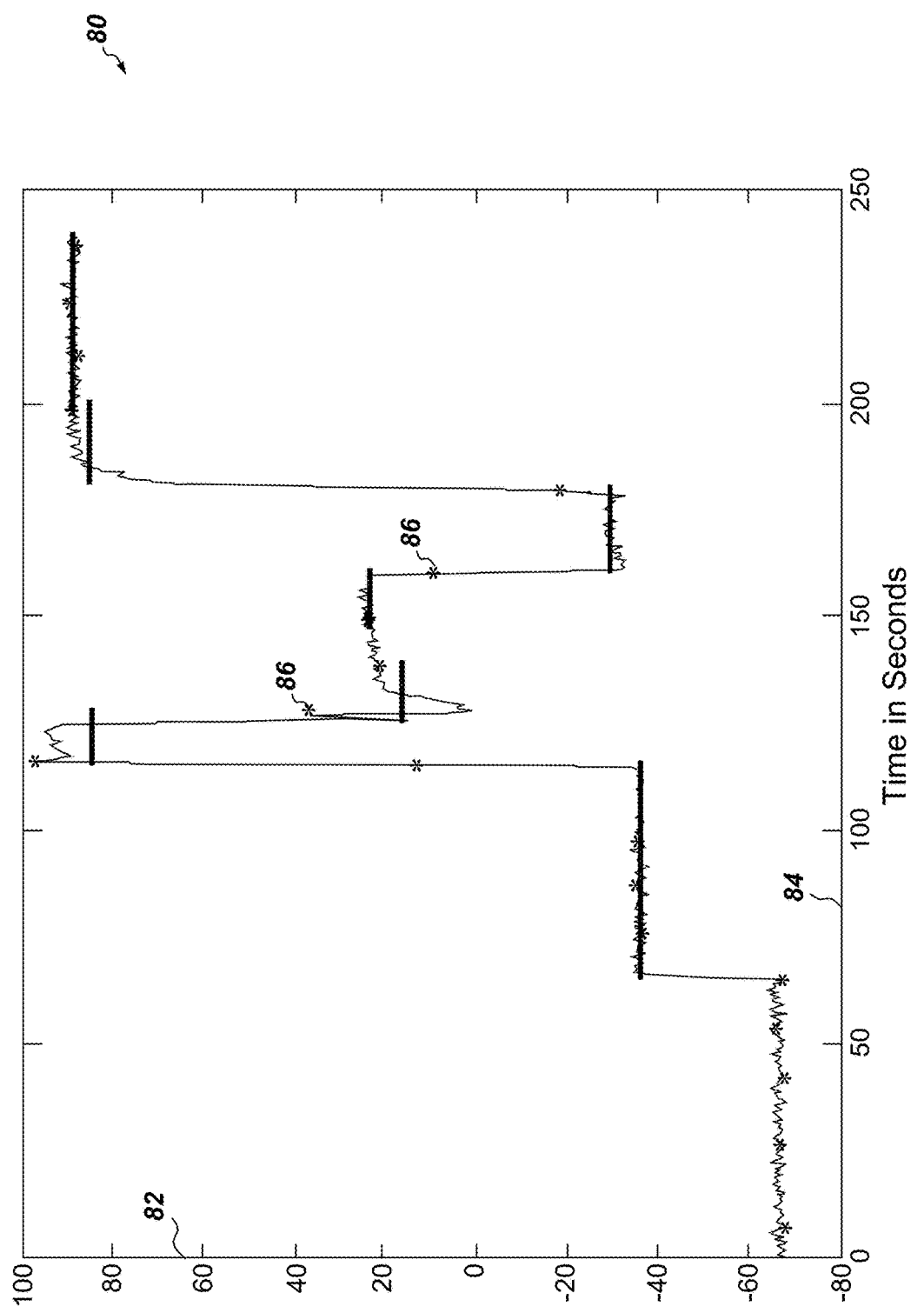
FIG. 5 illustrates segment levels jointly analyzed with a number of peaks, in accordance with one embodiment of this invention.
Figure 6:
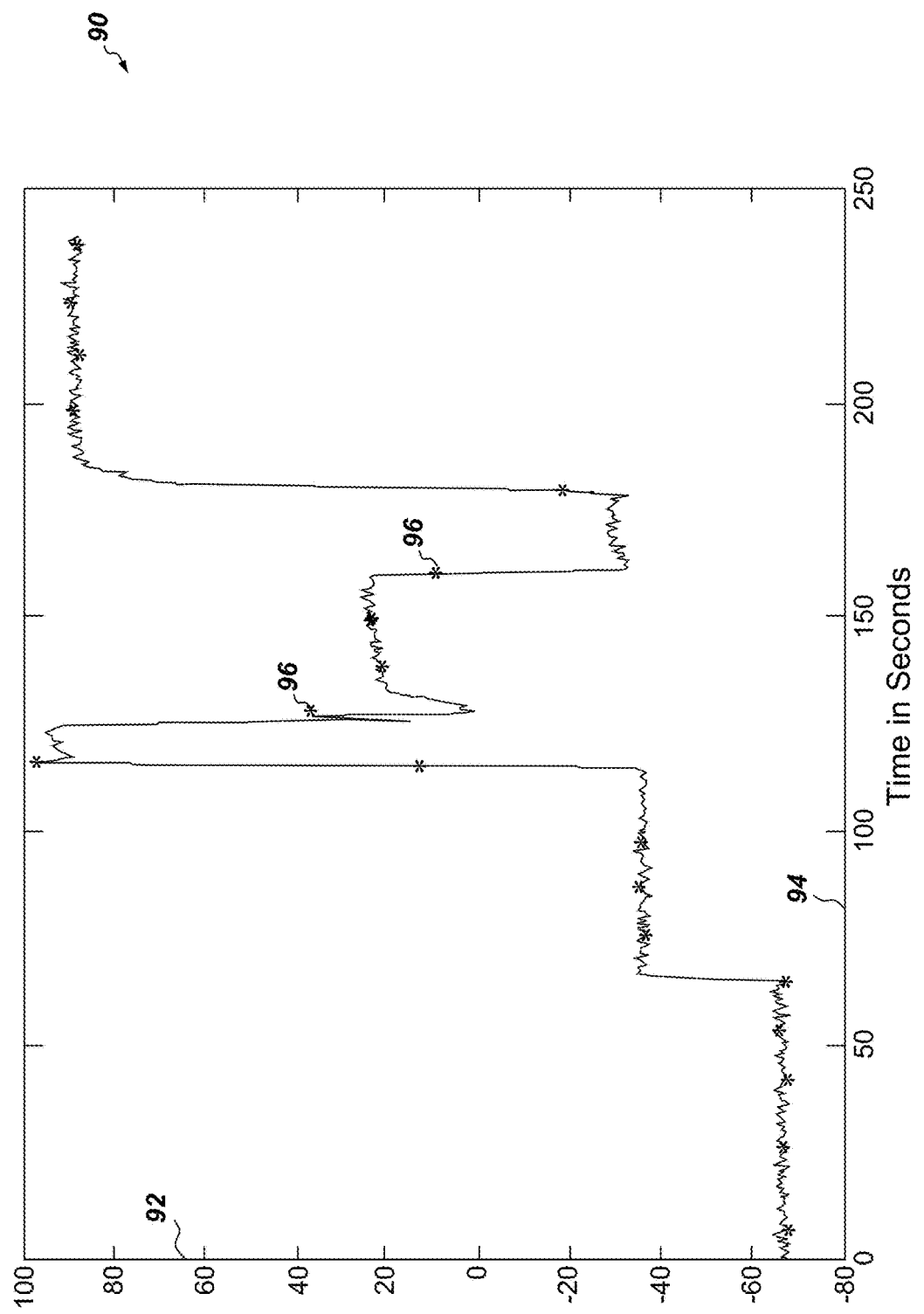
FIG. 6 illustrates final states after merging of segments in accordance with one embodiment of this invention.

PCA algorithm is applied next on dynamic data and principal components and weight factors corresponding to the largest Eigenvalue are retained. FIG. 4 illustrates a number of weight factors of principal components jointly analyzed with the segment boundaries from correlation analysis (76), as captured in plot 70 of factors on y-axis (72) vs. time in seconds (74), in accordance with one embodiment of this invention. FIG. 5 illustrates segment levels between peaks jointly analyzed, as captured in plot 80 of factors on y-axis (82) vs. time in seconds (84) in accordance with one embodiment of this invention. FIG. 5 shows the levels in black (86) wherein neighboring segments are merged, if levels are similar. FIG. 6 illustrates final states

(96) after merging of segments, as captured in plot 90 of factors on y-axis (92) vs. time in seconds (94) in accordance with one embodiment of this invention.

The process step identifying a number of final stationary frames from the presentation of a joint analysis combining results from the first analysis (e.g. correlation analysis) and the second analysis (e.g. principal component analysis), as in FIGS. 4, 5 and 6 includes computing mean values of a number of data driven gating (DDG) signals corresponding to each of the number of initial stationary frames and merging a number of neighboring frames, wherein a difference between the mean values of DDG signals corresponding to the neighboring frames is below a threshold value. Mean signal levels are computed between peaks. As there could be transitions, mean values are computed using signals between 10th and 90th percentile. The method step of registering each of the number of final stationary frames to a first state, include rigidly registering each of the number of final stationary frames to a first state and averaging the number of final stationary frames. The method step of extracting a number of first statistical parameters includes extracting each of the many weight factors corresponding to the largest Eigenvalue of the principal component.

Figure 7:
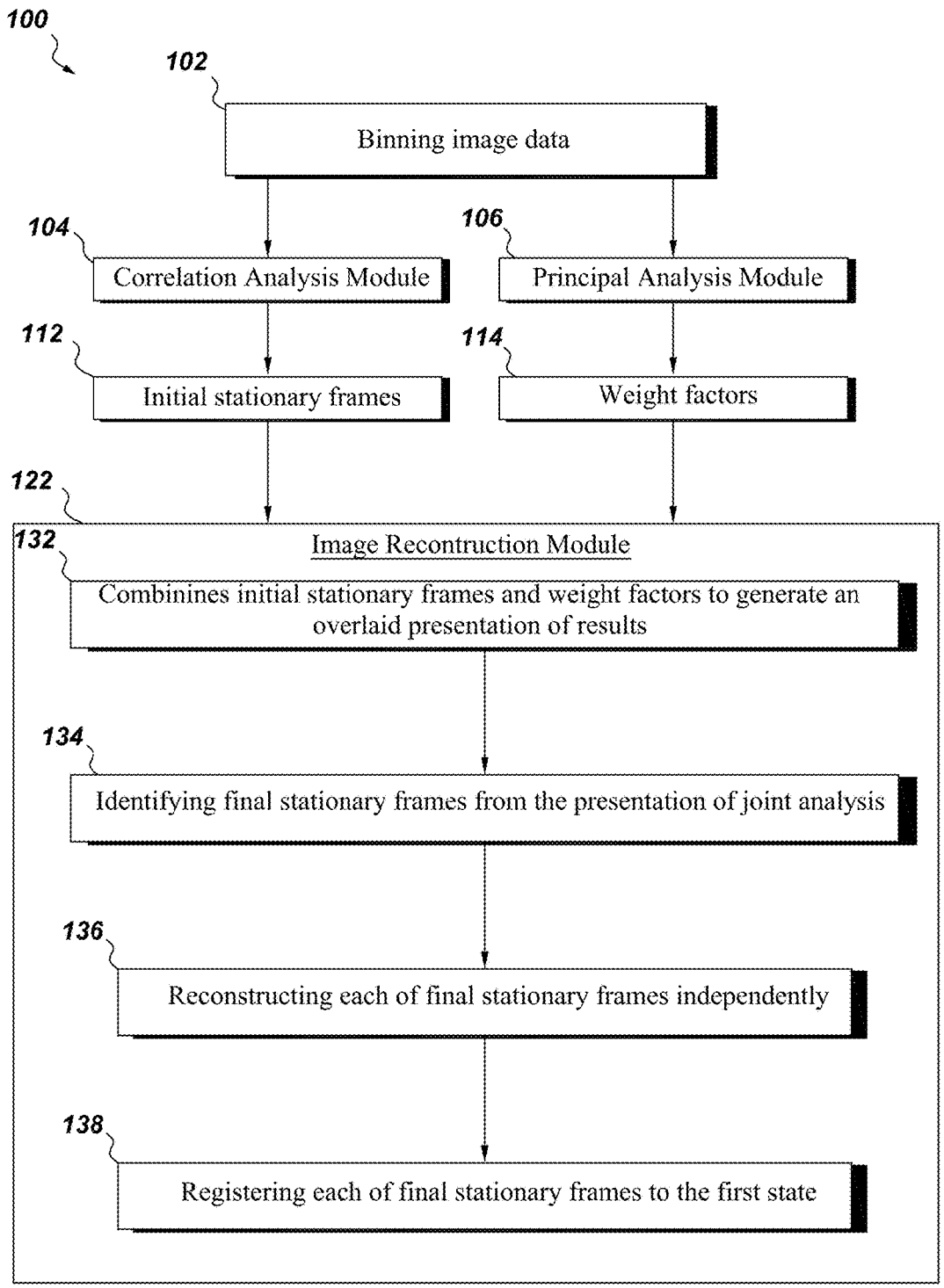
FIG. 7 illustrates a system of image analysis in accordance with one embodiment of this invention.

FIG. 7 illustrates a system for image analysis 100. System 100 includes a correlation analysis module 102 configured to receive a stream of PET list mode data binned into a number of sinogram frames, and identify a number of initial stationary frames 112 by applying a correlation analysis technique on the number of binned sinogram frames. System 100 also includes a principal analysis module 104 independently coupled to the correlation analysis module 102 and configured to receive the stream of PET list mode data binned into the number of sinogram frames, and extract a number of weight factors 114 applying a principal component analysis technique on the number of binned sinogram frames. System 100 further includes an image reconstruction module 122 independently coupled to the correlation analysis module 102 and the principal analysis module 104 and configured to combine the number of weight factors 114 with boundaries of the number of initial stationary frames 112 to generate a presentation of a joint analysis 132 of results from the correlation analysis and the principal component analysis, identify a number of final stationary frames 134 from the presentation of the joint analysis, independently reconstruct each of the number of final stationary frames 136, and register each of the number of final stationary frames to a first state 138.

The correlation analysis module 102 is further configured to relate each of the number of initial stationary frames to two successive ones of a number of relevant maxima points of an M-metric computed by applying the correlation analysis technique. Referring to FIG. 7 once more, the correlation analysis module 102 is further configured to eliminate a number of non-relevant maxima points from a number of initial maxima points of the M-metric based on a threshold minimum time distance between two successive ones of the number of initial maxima points to generate the number of relevant maxima points.

Referring to FIG. 7 once again, the image reconstruction module 122 is further configured to compute mean values of a number of data driven gating (DDG) signals corresponding to each of the number of initial stationary frames, and merge a number of neighboring frames, wherein a difference between the mean values of DDG signals corresponding to the neighboring frames is below a threshold value. The image reconstruction module 122 is further configured to rigidly register each of the number of final stationary frames to the first state and average the number of final stationary frames. In one embodiment of the invention, each of the number of weight factors corresponds to a largest Eigenvalue of the principal component.

In certain other embodiments of the present invention, the image analysis system 100 is a computer based system having electrical circuitry configured to process image data binned in the form of sinograms. Further, the image analysis system 100 may include non-transitory, computer-readable medium storing instructions that, when executed by a computer processor, cause the computer processor to perform a method 40 of image analysis described in details above. For example, the image analysis system 100 may include processors, storage devices, and memory devices. The processor(s) may be used to execute software, such as text processing software, and so forth. Moreover, the processor(s) may include one or more microprocessors, such as one or more "general-purpose" microprocessors, one or more special-purpose microprocessors, and/or application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., text data, etc.), instructions (e.g., software or firmware for processing text, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for an image analysis software.

In certain embodiments, the image analysis system 100 may include a communication device (e.g., network interface, wireless communication module, etc.) configured to communicate (e.g., via wired or wireless signals) with a remote server or a cloud-based computer network, for example. In such embodiments, the image analysis system 100 may output signals indicative of the extracted final stationary frames, each registered to the first state. The remote server or network may store and/or process the signals to facilitate short-term and/or long-term image analysis. For example, the remote server or network may compare an extracted and disambiguated concept with previously stored database of positive concept examples and negative concept examples in order to identify confidence scores for the purpose of validation.

The framework proposed herein was tested on few phantom acquisitions as well a clinical dataset. The durations and timings of the stationary head states predicting by the experimental framework matched favorably with the ground truth. All the steps of the algorithm are tested using a phantom scan, where the phantom was scanned for a total duration of 4 minutes. The phantom was moved during the experiment five times at time instances—{65, 115, 125, 160 and 180 seconds}. Data sections below proved more details on various phantom studies carried out.

The machine used for the experiments, a GE SIGNA PET/MR machine combines MR-compatible Time-Of-Flight (TOF) PET detectors with a high performance 3.0T MR scanner enabling true simultaneous PET/MR acquisitions. Three phantom studies and one volunteer study were performed. The details of the experiments are given below.

Phantom Study 1—MR Phantom Study

Three 0.36 MBq Germanium-68 point sources were affixed to an MR-visible cylindrical phantom, which is filled with G3 Silicone fluid. The phantom/point source combination was placed at the center of the field of view inside the PET/MR scanner. A 3-minute single-bed PET exam was then acquired. At 1 minute into the scan, the phantom combination was manually rolled about 10 cm to the right side of the field of view. The same procedure was repeated at 2 minutes into the acquisition, with the phantom being rolled halfway back towards the center of the field of view. Except during the manual rolling operations, the phantom combination remained static inside the scanner.

Phantom Study 2—HNU Phantom Study 1

Three 0.36 MBq Germanium-68 point sources were affixed to a cylindrical phantom filled with a mixture containing 84 MBq of Germanium-68. The phantom/point source combination was placed at the center of the field of view inside the PET/MR scanner. A 4-minute single-bed PET exam was then acquired. The phantom combination was manually moved to a new random location at 65, 115, 125, 160, and 180 seconds from the start of the PET acquisition.

Phantom Study 3—HNU Phantom Study 2

The same experimental setup as in Phantom study 2 was repeated with only the time at which the phantom combination was manually moved. The times specific to this experiment are: 60, 80, 115, 125, and 175 seconds from the start of the PET acquisition.

Subject Study—UCSF

A patient injected with 7.2 mCi of FDG had agreed to volunteer for this experiment. The volunteer was placed supine head-first inside a head coil on top of the PET/MR cradle. The bed was then moved into the scanner such that the volunteer's head was at the center of the PET scanner's field of view. A 5-minute single-bed PET exam was acquired, during which the volunteer was asked to move his or her head to a new position once every 30-second intervals. This resulted in 10 separate head positions, each lasting 30 seconds.

Analysis and Results:

Since the times of motion in both phantom and volunteer study were known, comparison with the algorithm's results is provided. Improvement in image quality is shown by reconstructing the entire subject study scan and comparing with the motion compensated result with the motion inferred by the disclosed algorithm. In all the phantom and subject studies, the time boundaries of the stationary head states detected by the algorithm was found to be in conformance with the ground truth.

Phantom Study 1:
Ground truth Frame boundaries: [0 60 120 180]
Algorithm result: [0 62 121 180]
Phantom Study 2:
Ground truth Frame boundaries: [0 65 115 125 160 180 240]
Algorithm result: [0 65 116 127 161 180 240]
Phantom Study 3:
Ground truth Frame boundaries: [0 60 80 115 125 175 240]
Algorithm result: [0 61 77 89 115 126 176 240]
UCSF Subject Study:
Ground truth Frame boundaries: [0 30 60 90 120 150 180 210 240 270 300]
Algorithm result: [0 32 61.5 92 121 151 180 213 241 272 300]

Except in Phantom study 3, the number of stationary states and the duration of the states match almost identically with the ground truth. In Phantom study 3, an extra state was detected at 89 sec. Finally, to illustrate the importance of motion detection to image quality, the PET image reconstructed using the entire acquisition from the subject study. Ten smaller frames also reconstructed defined by the time boundaries given by the disclosed algorithm. These 10 reconstructed frames rigidly registered and averaged. The results demonstrate the efficacy of the disclosed approach on multiple phantom studies and one subject study. In conclusion, it is found out that the time-instances of head movement detected by the disclosed algorithm is in close agreement with the ground truth.

Figure 8:
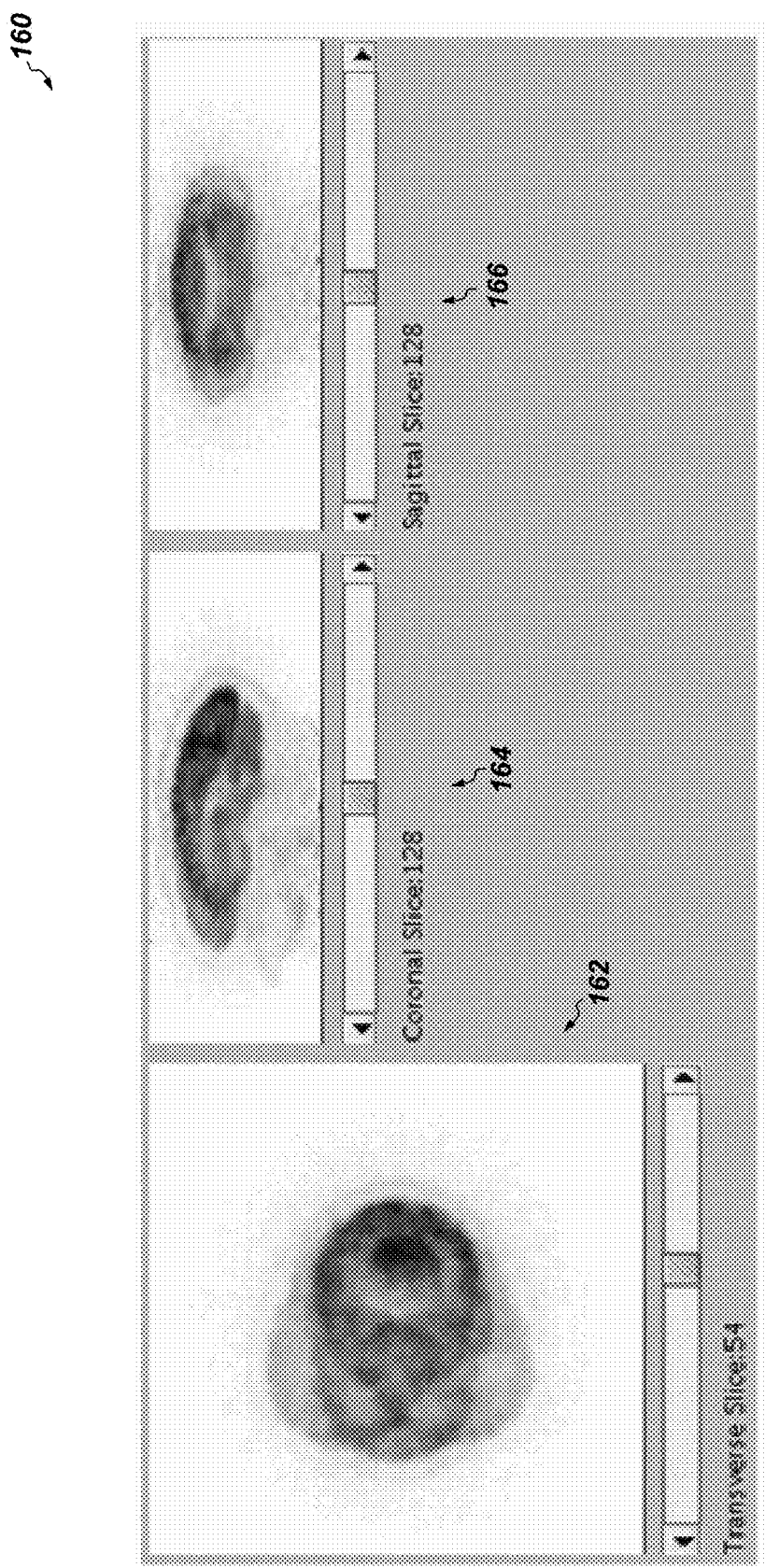
FIG. 8 illustrates PET image reconstructed using entire 3 min data.
Figure 9:
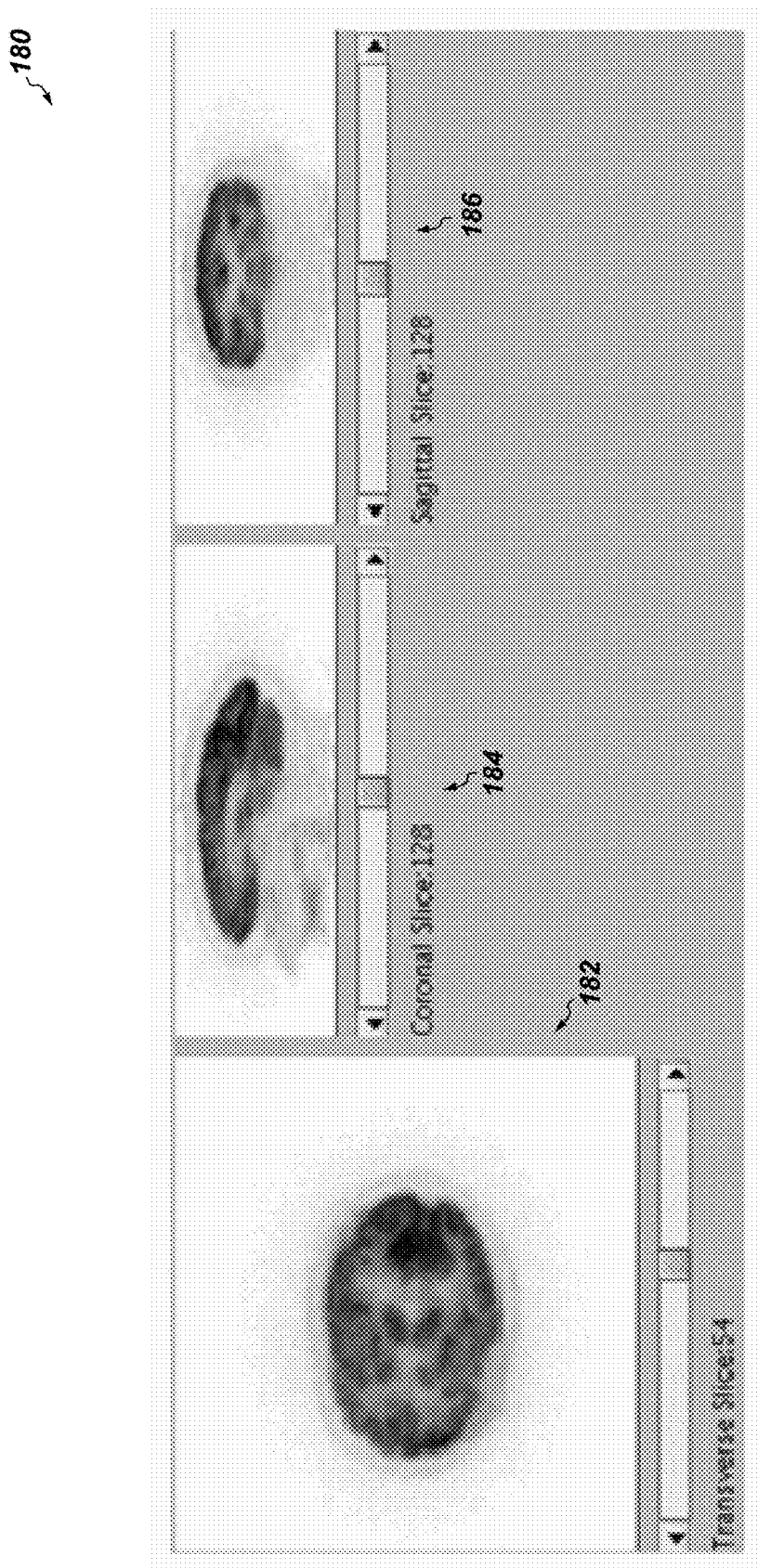
FIG. 9 illustrates image obtained after reconstructing 10 stationery frames independently followed by rigid registration to the first state and averaging.

Typical PET scans are performed over several minutes and it is impossible for the subject not to move the head. Such patient induced motion can affect the image quality adversely. In this disclosure, a fully automated and data-driven approach is proposed for detecting patient head motion from PET scans. The accuracy of the approach is demonstrated on phantom studies and a volunteer study. In addition, the improvement in image reconstruction quality is also demonstrated by incorporating the motion detection step. FIG. 8 illustrates PET image reconstructed using entire 3 min data. As shown in the Transverse slices 162, Coronal slices 164, and Sagittal slices 166 in the series 160 of FIG. 8, head motion severely affects the final reconstruction image quality due to blurring and other severe artifacts. FIG. 9 illustrates image obtained after reconstructing ten stationery frames independently followed by rigid registration to the first state and averaging. As shown in the Transverse slices 182, Coronal slices 184, and Sagittal slices 186 in the series 180 of FIG. 9, image quality is significantly enhanced by detecting frames of minimal motion, followed by reconstruction and registration.

In this disclosure, a framework is described for detecting patient head motion during PET scans. Specifically, the approach is automated and data-driven thereby eliminating the need for external sensors like video cameras, infra-red motion tracking devices etc. to monitor patient head movement. An automated and a cost-effective solution are provided to improve reconstructed image quality under patient head motion.

In essence, gross head motion is inferred by analyzing PET sinogram data. A method is proposed that combines Correlation analysis and PCA analysis yielding a fully automated and data-driven technique. A framework is proposed for detecting patient head motion during PET scans. Specifically, the approach as embodied in this invention is automated and data-driven thereby eliminating the need for external sensors like video cameras, infra-red motion tracking devices etc. to monitor patient head movement. The two-step algorithm proposed in this disclosure processes the PET-sinogram data to automatically detect patient's gross head motion and bin the data into multiple frames where intra-frame motion is minimized. Once the stationary head states are identified, motion between these states can be compensated by registration algorithms resulting in a high quality PET image.

Thus, any need for using an external device to track head motion is eliminated, thus making the scan procedure and the workflow easier, reducing cost and managing patients better. The framework proposed here is generic and can be applied on other modalities such as Magnetic Resonance (MR) and X-ray as well, circumventing the need for new algorithms. At least two strong practical advantages of the proposed image analysis system and method are data-driven algorithm that eliminates the need for external trackers and fully automated solutions till each of final stationary frames is registered to the first state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of producing an average reconstructed image from a series of electronically transmitted and received PET images to eliminate effects of one or more periods of movement of a patient's head, the method comprising:

electronically receiving an imaging dataset transmitted from a Positron Emission Tomography (PET) scanner, the imaging dataset comprising a plurality of individual images in sequence over time;

concatenating the plurality of individual images, in sequence across time, into a plurality of sinogram frames;

applying a correlation analysis technique on the plurality of sinogram frames to identify a first plurality of stationary frames in which the patient's head is in a stationary position, the first plurality of stationary frames including a first stationary frame to be used as a reference frame;

applying a principal component analysis technique on the plurality of sinogram frames to extract a weight factor for each of the individual images of the plurality of sinogram frames, thereby producing a plurality of weight factors;

combining the plurality of weight factors from the principal component analysis technique with boundaries of the first plurality of stationary frames from the correlation analysis technique to generate a presentation of a joint analysis;

identifying a second plurality of stationary frames from the presentation of the joint analysis, the second plurality of stationary frames corresponding in number to the first plurality of stationary frames, each of the second plurality of stationary frames being temporally spaced apart from a respective stationary frame of the first plurality of stationary frames;

independently reconstructing each of the second plurality of stationary frames;

registering each of the second plurality of stationary frames to the reference frame; and averaging the second plurality of stationary frames after registering each of the second plurality of stationary frames to the reference frame, thereby creating the average reconstructed image that excludes the one or more periods of movement of the patient's head.

2. The method of claim 1, wherein the step of identifying the first plurality of stationary frames comprises:

computing an M-metric of each of the plurality of sinogram frames, using the equation $M(t)=1-C(t)$, where $C(t)$ equals a correlation between two sinogram frames separated by time;

producing a plot of M-metric values over time, the plot comprising a plurality of initial maxima points including a plurality of relevant maxima points and a plurality of non-relevant maxima points; and relating each of the first plurality of stationary frames to two successive ones of the plurality of relevant maxima points of the M-metric computed by applying the correlation analysis technique.

3. The method of claim 2, wherein the step of relating each of the first plurality of stationary frames to two successive ones of the plurality of relevant maxima points of the M-metric comprises eliminating the plurality of non-relevant maxima points from the plurality of initial maxima points of the M-metric based on a threshold minimum time distance between two successive ones of the plurality of initial maxima points to generate the plurality of relevant maxima points.

4. The method of claim 1, wherein the step of identifying the second plurality of stationary frames from the presentation of the joint analysis comprises:

computing mean values of a plurality of data driven gating (DDG) signals corresponding to each of the first plurality of stationary frames; and merging a plurality of neighboring frames, wherein a difference between the mean values of DDG signals corresponding to the neighboring frames is below a threshold value.

5. The method of claim 1, wherein the step of extracting a weight factor for each of the individual images of the plurality of sinogram frames, thereby producing a plurality of weight factors, comprises extracting each of the plurality of weight factors corresponding to the largest Eigenvalue of the principal component.

6. A non-transitory, computer-readable medium storing instructions that, when executed by a computer processor, cause the computer processor to perform a method of producing an average reconstructed image from a series of electronically transmitted and received PET images to eliminate effects of one or more periods of movement of a patient's head, the method comprising:

electronically receiving an imaging dataset transmitted from a Positron Emission Tomography (PET) scanner, the imaging dataset comprising a plurality of individual images in sequence over time;

concatenating the plurality of individual images, in sequence across time, into a plurality of sinogram frames;

applying a correlation analysis technique on the plurality of sinogram frames to identify a first plurality of stationary frames in which the patient's head is in a stationary position, the first plurality of stationary frames including a first stationary frame to be used as a reference frame;

applying a principal component analysis technique on the plurality of sinogram frames to extract a weight factor for each of the individual images of the plurality of concatenated sinogram frames, thereby producing a plurality of weight factors;

combining the plurality of weight factors from the principal component analysis technique with boundaries of the plurality of stationary frames from the correlation analysis technique to generate a presentation of a joint analysis;

identifying a second plurality of stationary frames from the presentation of the joint analysis, the second plurality of stationary frames corresponding in number to the first plurality of stationary frames, each of the second plurality of stationary frames being temporally spaced apart from a respective stationary frame of the first plurality of stationary frames;

independently reconstructing each of the second plurality of stationary frames;

registering each of the second plurality of stationary frames to the reference frame; and averaging the second plurality of stationary frames after registering each of the second plurality of stationary frames to the reference frame, thereby creating the average reconstructed image that excludes the one or more periods of movement of the patient's head.

7. The medium of claim 6, wherein the instructions used in the correlation analysis technique applied on the plurality of sinogram frames include instructions to:

compute an M-metric of each of the plurality of concatenated sinogram frames, using the equation $M(t)=1-C(t)$, where $C(t)$ equals a correlation between two sinogram frames separated by time;

produce a plot of M-metric values over time, the plot comprising a plurality of initial maxima points including a plurality of relevant maxima points and a plurality of non-relevant maxima points; and relate each of the first plurality of stationary frames to two successive ones of the plurality of relevant maxima points of the M-metric computed by applying the correlation analysis technique.

8. The medium of claim 7, wherein the instructions used in the correlation analysis technique applied on the plurality of sinogram frames include instructions to eliminate the plurality of non-relevant maxima points from the plurality of initial maxima points of the M-metric based on a threshold minimum time distance between two successive ones of the plurality of initial maxima points to generate the plurality of relevant maxima points.

9. The medium of claim 6, wherein the instructions used to identify the second plurality of stationary frames from the presentation of the joint analysis comprise instructions to:

compute mean values of a plurality of data driven gating (DDG) signals corresponding to each of the first plurality of stationary frames; and merge a plurality of neighboring frames, wherein a difference between the mean values of DDG signals corresponding to the neighboring frames is below a threshold value.

10. The medium of claim 6, wherein the instructions used to extract the plurality of weight factors comprise instructions to extract each of the plurality of weight factors corresponding to the largest Eigenvalue of the principal component.

11. A system for producing an average reconstructed image from a series of electronically transmitted and received PET images that eliminates effects of a patient's head movement, the system comprising:

a Positron Emission Tomography (PET) scanner configured to generate and electronically transmit an imaging dataset of a patient's head;

a computer operationally coupled the PET scanner to electronically receive the imaging dataset from the PET scanner, wherein the computer is programmed with sets of instructions corresponding to a correlation analysis module, a principal analysis module, and an image reconstruction module, each of the correlation analysis module, the principal analysis module, and the image reconstruction module being used together to identify one or more periods of movement of the patient's head and to remove corresponding images taken during the one or more periods of movement from the imaging dataset;

wherein the correlation analysis module includes instructions to:

concatenate individual images from the PET imaging dataset, in sequence across time, into a plurality of sinogram frames; and apply a correlation analysis technique on the plurality of sinogram frames to identify a first plurality of stationary frames in which the patient's head is in a stationary position, the first plurality of stationary frames including a first stationary frame to be used as a reference frame;

wherein the principal analysis module includes instructions to:

receive the plurality of sinogram frames from the correlation analysis module; and apply a principal component analysis technique on the plurality of sinogram frames to extract a weight factor for each of the individual images of the plurality of sinogram frames, thereby producing a plurality of weight factors;

wherein the image reconstruction module includes instructions to:

combine the plurality of weight factors from the principal analysis module with boundaries of the plurality of stationary frames from the correlation analysis module to generate a presentation of a joint analysis;

identify a second plurality of stationary frames from the presentation of the joint analysis, the second plurality of stationary frames corresponding in number to the first plurality of stationary frames, each of the second plurality of stationary frames being temporally spaced apart from a respective stationary frame of the first plurality of stationary frames;

independently reconstruct each of the second plurality of stationary frames;

register each of the second plurality of stationary frames to the reference frame; and average the second plurality of stationary frames after registering each of the second plurality of stationary frames to the reference frame, thereby creating the average reconstructed image that excludes the one or more periods of movement of the patient's head.

12. The system of claim 11, wherein the correlation analysis technique applied on the plurality of concatenated sinogram frames by the correlation analysis module includes instructions to:

compute an M-metric of each of the plurality of sinogram frames, using the equation $M(t)=1-C(t)$, where $C(t)$ equals a correlation between two sinogram frames separated by time;

produce a plot of M-metric values over time, the plot comprising a plurality of initial maxima points including a plurality of relevant maxima points and a plurality of non-relevant maxima points; and relate each of the first plurality of stationary frames to two successive ones of the plurality of relevant maxima points of the M-metric computed by applying the correlation analysis technique.

13. The system of claim 12, wherein the correlation analysis module includes further instructions to eliminate the plurality of non-relevant maxima points from the plurality of initial maxima points of the M-metric based on a threshold minimum time distance between two successive ones of the plurality of initial maxima points to generate the plurality of relevant maxima points.

14. The system of claim 12, wherein the image reconstruction module includes further instructions to:
- compute mean values of a plurality of data driven gating (DDG) signals corresponding to each of the first plurality of stationary frames; and
- merge a plurality of neighboring frames, wherein a difference between the mean values of DDG signals corresponding to the neighboring frames is below a threshold value.

15. The system of claim 11, wherein each of the plurality of weight factors corresponds to a largest Eigenvalue of the principal component.

* * * * *